(No Model.)
W. S. BREWER.
BICYCLE.
No. 579,125. Patented Mar. 23, 1897.
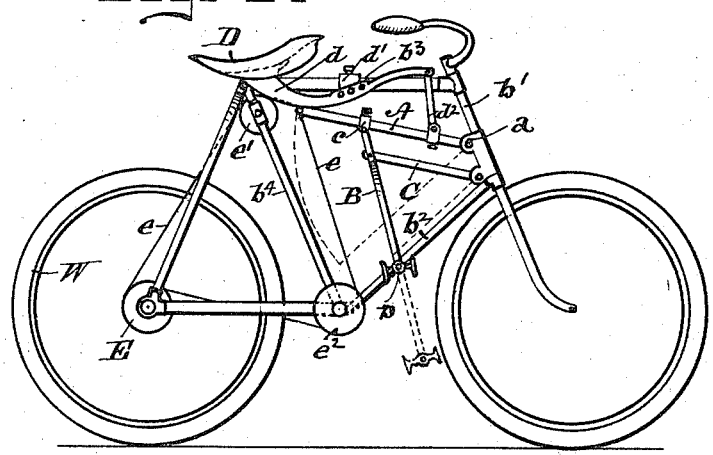
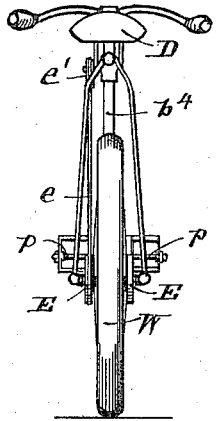
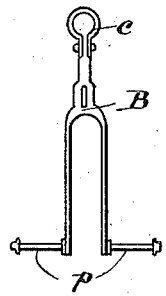

UNITED STATES PATENT OFFICE.

WILLIAM S. BREWER, OF NEW YORK, N. Y.

BICYCLE.

SPECIFICATION forming part of Letters Patent No. 579,125, dated March 23, 1897.

Application filed October 10, 1895. Serial No. 565,206. (No model.)

*To all whom it may concern:*

Be it known that I, WILLIAM S. BREWER, a citizen of the United States, residing at New York city, New York, have invented new and useful Improvements in Bicycles, of which the following is a specification.

My invention relates to bicycles, its object being to produce a bicycle in which the weight and strength of the rider are more fully utilized as a propelling force and in such manner as to bring the muscles of the body more generally into play than is practicable in ordinary bicycles.

To this end it consists in a bicycle embodying in its driving mechanism a reciprocating seat and a system of connecting-levers and foot-pedals connected in opposite relations with oscillating clutch devices upon the driving-wheel, as herein set forth, whereby by alternately transferring the weight of the body from the seat to the foot-pedals the lever is reciprocated and its motion communicated to the driving-wheel.

My invention is illustrated in the accompanying drawings, in which—

Figure 1 is a general side elevation of the improved bicycle complete; Fig. 2, a rear elevation of the same; Fig. 3, a detail rear view of the hanger.

The frame of the bicycle as herein shown is of the usual type and will require no special description. I dispense with the usual seat or saddle, sprocket-wheels, chain, and foot-cranks and substitute the following-described mechanism:

The main driving element is a horizontal lever A, pivoted to a clip $a$, attached to the front sleeve $b'$ and oscillating in a vertical plane up and down in the opening of the frame. Motion is given it by a bifurcated hanger or link B, Figs. 1 and 3, pivoted by means of a clip $c$ to the lever A and provided at its lower extremities with pins or studs $p\ p$, projecting outwardly and provided with the usual foot-rests. A parallel rod C, also pivoted to the clip $a$ (on the sleeve $b'$) beneath the lever A, is also pivotally connected to the hanger B and retains it always in an approximately vertical plane. The bifurcations of the hanger enable it to "straddle" the lower brace $b^2$ of the frame, and the weight of the rider upon his feet placed on the studs $p$ impels the lever A downward. Its upward movement is secured by the weight of the rider seated upon a saddle D, carried upon a lever $d$, pivoted by means of a clip $d'$ to the upper bar $b^3$ of the frame and connected at its forward end by a pivotal link $d^2$ with the lever A. Thus the weight of the rider upon the saddle D lifts the lever A, and by transferring the weight to the hanger B the lever A is depressed. This alternate transfer of the rider's weight from the saddle to the hanger furnishes the propelling power through the lever A to the rear wheel W through the following mechanism:

At each side of the wheel W, I attach an oscillating clutch device E of any suitable description, (details of which I have not thought it necessary to describe herein, as such devices are common,) whose oscillating element is provided with a retractile spring. Upon the oscillating drum of each clutch device is wound a cord or band $e$, carried over a suitably-disposed idler-pulley and attached to the rear end of the lever A. The clutches being constructed to engage the wheel W in the same relative direction, one of the bands $e$ passes over an idler-pulley $e'$ near the upper end of the central strut $b^4$ of the frame, and the other band $e$ is carried beneath an idler $e^2$, journaled upon a stud carried in the lower crotch of the frame at the rear end of the brace $b^2$. Either motion of the lever A thus impels the driving-wheel forward, while the bands are wound back again by the spring acting upon the clutch in the usual manner.

The clip attachment of the seat-lever $d$ is adjustable forward or backward to regulate the relation of weight and leverage desired.

I claim as my invention and desire to secure by Letters Patent of the United States—

1. In a bicycle, the combination of a seat-lever pivotally mounted on the top brace of the frame, a driving-lever pivoted to the front brace of the frame beneath and pivotally connected to the seat-lever, a bifurcated foot-hanger hung to said driving-lever, oscillating clutch devices upon the driving-wheel, and bands connecting the free end of the driving-lever with the clutch devices, respectively, substantially as set forth.

2. In a bicycle, of the character indicated, the combination of the pivoted seat-lever, the pivoted driving-lever linked thereto, the auxiliary lever pivoted in line with the driving-lever and oscillating parallel therewith, and the bifurcated foot-hanger pivoted to both driving and auxiliary levers, equidistant from their fulcrums, the oscillating clutches upon the driving-wheel, and band connections, thence with the driving-lever, substantially as set forth.

In testimony whereof I have hereunto set my hand in the presence of two subscribing witnesses.

WILLIAM S. BREWER.

Witnesses:
L. M. HOSEA,
FRANK L. BOWMAN.